United States Patent [19]

Schrenk et al.

[11] Patent Number: 5,568,316
[45] Date of Patent: Oct. 22, 1996

[54] FORMABLE REFLECTIVE MULTILAYER BODY

[75] Inventors: Walter J. Schrenk; Charles B. Arends; Conrad F. Balazs; Ray A. Lewis; John A. Wheatley, all of Midland, Mich.

[73] Assignee: The Dow Chemical Company, Midland, Mich.

[21] Appl. No.: 421,170

[22] Filed: Apr. 13, 1995

Related U.S. Application Data

[62] Division of Ser. No. 242,713, May 13, 1994, Pat. No. 5,448,404, which is a continuation of Ser. No. 969,710, Oct. 29, 1992, abandoned.

[51] Int. Cl.⁶ ................................................. G02B 1/10
[52] U.S. Cl. .......................... 359/584; 359/580; 359/582; 359/588
[58] Field of Search .................................... 359/580, 582, 359/584, 586, 588

[56] References Cited

U.S. PATENT DOCUMENTS

| | | | |
|---|---|---|---|
| Re. 31,780 | 12/1984 | Cooper et al. | |
| 3,557,265 | 1/1971 | Chisholm et al. | 264/46.1 |
| 3,687,589 | 8/1972 | Schrenk | 425/131.1 |
| 3,711,176 | 1/1973 | Alfrey, Jr. et al. | 359/359 |
| 3,759,647 | 9/1973 | Schrenk | 425/133.5 |
| 3,773,882 | 11/1973 | Schrenk | 264/173.12 |
| 3,884,606 | 5/1975 | Schrenk | 425/133.5 |
| 4,957,371 | 9/1990 | Pellicori et al. | 359/586 |
| 4,966,438 | 10/1990 | Mouchart et al. | 359/586 |
| 5,094,788 | 3/1992 | Schrenk et al. | 264/173.15 |
| 5,094,793 | 3/1992 | Schrenk et al. | 264/173.15 |
| 5,103,337 | 4/1992 | Schrenk et al. | 359/588 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/586 |
| 5,149,578 | 9/1992 | Wheatley et al. | 359/586 |
| 5,233,465 | 8/1993 | Wheatley et al. | 359/588 |
| 5,262,894 | 11/1993 | Wheatley et al. | 359/586 |
| 5,278,694 | 1/1994 | Wheatley et al. | 359/586 |
| 5,353,154 | 10/1994 | Lutz et al. | 359/586 |

OTHER PUBLICATIONS

Radford et al, "Reflectivity of Iridescent Coextruded Multilayered Plastic Films," *Polymer Engineering and Science*, May 1973, vol. 13, No. 3.
Schrenk et al, "Coextruding Multilayer Blown Film—Part I", SPE Journal, Jun. 1993, vol. 29.
Schrenk et al, "Coextruding Multilayer Blown Film—Part II", SPE Journal, Jul. 1973, vol. 29.

*Primary Examiner*—Paul M. Dzierzynski
*Assistant Examiner*—Darren E. Schuberg

[57] ABSTRACT

A formable multilayer reflective polymeric body which has a substantially uniform broad bandwidth reflectance over substantially the entire range of the visible spectrum to provide a substantially uniform reflective appearance is provided. The body includes at least first and second diverse polymeric materials, the body comprising a sufficient number of alternating layers of the first and second polymeric materials such that at least 40% of visible light incident on the body is reflected. A substantial majority of the individual layers of the body have optical thicknesses in the range where the sum of the optical thicknesses in a repeating unit of the polymeric materials is greater than about 190 nm, and the first and second polymeric materials differ from each other in refractive index by at least about 0.03.

9 Claims, 9 Drawing Sheets

FORMABLE REFLECTIVE MULTILAYER BODY

This is a divisional of application Ser. No. 08/242,713 filed May 13, 1994, now U.S. Pat. No. 5,448,404, which is a continuation of application Ser. No. 07/969,710 filed Oct. 29, 1992, now abandoned.

BACKGROUND OF THE INVENTION

The present invention relates to a formable multilayer polymeric body which exhibits image sharpness and a high degree of reflectance over substantially the entire visible region of the spectrum (i.e., substantially colorless), and to articles produced therefrom which may find use as mirrors, reflectors and other reflective parts and trim, lenses, polarizers, and the like.

Conventional methods for fabricating reflective surfaces include forming such surfaces of highly polished metals. Because of the high costs and fabricating problems involved in using metals, more recently fabricators have used plastic surfaces which contain thin coatings of metal thereon. Thus, metal coated plastic articles are now commonly found as both decorative and functional items in a number of industries including commercial and industrial lighting applications. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like.

Typically, such metal coated plastic articles are formed by electroplating or by the vacuum, vapor, or chemical deposition of a thin metal layer on the surface of the article. It has been observed that such coatings are subject to chipping and flaking of the metal as well as corrosion of the metal over time. If additional protective layers must be applied over the metal coating to protect it, additional labor and materials costs are involved. Further, there may be environmental disposal problems with some metal deposition processes.

Thermoforming equipment is widely available and capable of being readily adapted to form a variety of shapes and finished parts from sheets of thermoplastic material. One major drawback in the use of metal coated plastic articles is that the metal must be deposited on a plastic surface which has been previously shaped into a finished article. This limits the users of such processes to those who have the capability of vacuum or other metallization techniques. Thus, sheets of metallized thermoplastic cannot generally be thermoformed into articles requiring significant draw.

Multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform layer thicknesses. The number of layers may be multiplied by the use of a device as described in commonly-assigned U.S. Pat. No. 3,759,647 to Schrenk et al.

Alfrey, Jr. et al, U.S. Pat. No. 3,711,176, teaches a multilayered highly reflective thermoplastic body fabricated using optically thin film techniques. That is, the reflective thin film layers of Alfrey, Jr. et al rely on the constructive interference of light to produce reflected visible, ultraviolet, or infrared portions of the electromagnetic spectrum. Such reflective thin films have found use in decorative items because of the iridescent reflective qualities of the film. See also, Cooper, U.S. Pat. No. Re. 31,780.

However, the films of Alfrey, Jr. are extremely sensitive to thickness changes, and it is characteristic of such films to exhibit streaks and spots of nonuniform color. Further, color reflected by such films is dependent on the angle of incidence of light impinging on the film. Thus, such films are not practical for uses which require uniformity of reflectivity (i.e., colorless and substantially noniridescent). Moreover, such films are not practical to thermoform into articles as localized thinning of the layers during thermoforming causes alterations in the iridescent coloring and reflective characteristics of the films.

Radford et al, "Reflectivity of Iridescent Coextruded Multilayered Plastic Films", *Polymer Engineering and Science*, vol. 13, No. 3 (May 1973), proposed introducing a linear layer thickness gradient into a multilayer optically thin film to produce a film which would reflect the majority of the visible spectrum and exhibit a metallic appearance. Again, however, the films proposed by Radford et al would not be practical to thermoform into articles as localized thinning of the layers during thermoforming would cause alterations in the reflective characteristics of the films and induce iridescent colors.

More recently, multilayer coextrusion technology has been used to fabricate reflective multilayer films and sheets made up of optically thick layers (optical thickness of greater than about 0.45 μm) or a combination of optically thick and optically very thin layers (optical thickness of less than about 0.09 μm). See, Wheatley et al., U.S. Pat. No. 5,122,905, Wheatley, U.S. Pat. No. 5,122,906, and Wheatley et al, U.S. Pat. No. 5,126,880. The latter describes a uniformly reflective all polymer body in which the iridescent effects from optically thin layers are masked.

While such multilayer bodies reflect substantially uniformly over the entire visible spectrum and are essentially colorless and noniridescent, there are drawbacks to their use in the thermoforming of articles. To maintain high reflectivity, relatively thick sheets (e.g., 2.5 mm or thicker) of a thousand or more layers must be used. Drawing of such sheets during thermoforming, even for relatively low draw ratios of 2:1 or less, also may bring on the onset of undesirable iridescence as optically thick layers in the sheet are thinned into the optically thin range. Even when drawn, the sheet thickness may still be greater than that desired for a particular application.

Accordingly, the need still exists in this art for a formable multilayer polymeric body which exhibits image sharpness and has a high substantially uniform reflectivity in the visible region of the spectrum and which can maintain such uniform reflectivity during drawing conditions typically encountered in thermoforming operations.

SUMMARY OF THE INVENTION

The present invention meets that need by providing a formable multilayer reflective polymeric body which has a substantially uniform broad bandwidth reflectance over substantially the entire range of the visible spectrum to provide a substantially uniform reflective appearance. By "substantially uniform reflective appearance", we mean an essentially colorless, noniridescent reflective appearance. The body also exhibits image sharpness, i.e., non-blurred image edges in reflection. Further, the body may be thermoformed and drawn without affecting this substantially uniform reflective appearance. In another embodiment, the body may be made to be variably reflective.

The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption occurs. For example, a silver appearing (colorless) article reflects substantially all visible wavelengths, whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflection is referring.

According to one aspect of the present invention, a formable multilayer reflective polymeric body is provided which includes at least first and second diverse polymeric materials, the body comprising a sufficient number of alternating layers of the first and second polymeric materials such that at least 40% of visible light incident on the body is reflected. The term "at least 40% of visible light incident on the body" refers, as discussed above, to reflected light at wavelengths where negligible absorption occurs. Preferably, the body has at least 1000 layers. In certain preferred embodiments, at least 80% of visible light incident on the body is reflected.

A substantial majority of the individual layers of the body have optical thicknesses in the range where the sum of the optical thicknesses in a repeat unit of the polymeric materials is greater than about 190 nm, and the first and second polymeric materials differ from each other in refractive index by at least about 0.03. In a typical two component body, the polymeric materials will have the repeat unit AB, where A and B represent the different polymers. For three or more component bodies, other repeating units are possible such as for example ABCB or ABCABC. For a preferred two component body, with an AB repeat unit, a preferred ratio of optical thicknesses between the A and B components in the repeat unit is 2:1.

The layers in the polymeric body have a gradient of optical layer repeat unit thicknesses spanning a range of repeat unit thicknesses of at least about 190 nm to 340 nm times a predetermined draw ratio of at least about 1.25 while maintaining a substantially uniform reflective appearance over substantially the entire range of the visible spectrum for the body. By "optical layer repeat unit", we mean the number of layers of polymeric materials which make up a regular, recurring pattern in the multilayer body. For example, as discussed above, for a typical two component body the polymeric materials will have a repeat unit AB, where A and B represent the different polymers. Such a repeat unit, AB, will have an optical layer thickness of $N_A d_A + N_B d_B$, where $N_A$ and $N_B$ are the refractive indices of the polymers and $d_A$ and $d_B$ are the actual layer thicknesses of the polymers.

By "draw ratio" we mean the ratio of the initial to final thickness of the body. This ratio may be readily determined for specific shapes into which the body is formed. Draw ratios of 1.25:1 or greater are commonly encountered in thermoforming operations. In a preferred embodiment, the optical layer repeat units have a gradient such that the wavelengths of the first order reflections from the thinnest and thickest of the layers in a repeat unit differ by a factor of at least two.

By a gradient of optical layer repeat unit thicknesses, we mean a change in the thickness of the optical layer repeat units across the thickness of the body so that there is a difference in the optical repeat unit thickness between the thinnest and thickest optical repeat units in the multilayer stack. A preferred gradient of optical layer repeat unit thicknesses in the practice of the present invention is a gradient of greater than two, meaning that the thickest optical layer repeat unit in the stack is at least twice as thick as the thinnest optical layer repeat unit. The gradient of optical layer repeat unit thicknesses may be a linear function, a logarithmic function, a quartic function, or a quartic function superimposed on a linear gradient. In general, the gradient of optical layer repeat unit thicknesses may be any function which provides continuous wavelength coverage spanning a predetermined range of wavelengths.

In one embodiment of the invention, a substantial majority of the individual layers of the body have optical thicknesses in the range where the sum of the optical thicknesses in a repeating unit of the polymeric materials is between about 190 nm and 1700 nm. Alternatively, the body initially may have a substantial majority of the individual layers with optical thicknesses in the range where the sum of the optical thicknesses in a repeating unit of the polymeric materials is greater than about 1700 nm. For this alternative embodiment, the reflectance of the body will increase upon the thinning of the initially optically thick layers into the optically thin range.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a two-sided mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect. Thermochromic pigments or dyes may be used to produce a color change as the temperature of the body changes. Additionally, coloring agents, gradient of optical layer repeat unit thicknesses, or a combination of the two may be used so that the reflection from the body simulates that of daylight.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

In some embodiments of the invention, a third polymer layer may be placed in the multilayer body as a barrier layer or toughening layer. When the third polymer layer is a barrier layer, it may be present as a single layer on one or both exterior surfaces of the body or as an interior layer. For example, suitable barrier layer materials such as hydrolyzed ethylene vinyl acetate, copolymers of polyvinylidene chloride, nitrile polymers, and nylons may be used in or on the multilayer body. Suitable adhesive materials such as maleic anhydride grafted polyolefins may be used to bond such barrier layer materials to the multilayer body.

Alternatively, or in addition, a third polymer layer may be found as a surface or skin layer on one or both major exterior surfaces for an ABABAB repeating body or as an interior layer. The skin layer may be sacrificial, or may be permanent and serve as scratch resistant or weatherable protective layer. Further, such skin layers may be post applied to the body after coextrusion. For example, a skin layer may be applied as a sprayed on coating which would act to level the surface of the body to improve optical properties and impart scratch resistance, chemical resistance and/or weatherability. The skin layer may also be laminated to the multilayered body. Lamination is desirable for those polymers which are not readily coextrudable.

In yet another embodiment of the invention, a formable polymeric multilayer variably reflective sheet is provided which possesses a varying reflectance across the surface of the sheet. That is, the measured reflectance of the sheet changes from one side to the other. The sheet includes at least first and second diverse polymeric materials which comprise a sufficient number of alternating layers such that at least a portion of visible light incident on the sheet is reflected. A substantial majority of the individual layers of the sheet have optical thicknesses in the range where the sum of the optical thicknesses in a repeating unit of said polymeric materials is greater than about 190 nm, and the first and second polymeric materials differ from each other in refractive index by at least about 0.03.

The individual layers vary in thickness across the sheet and the layers have a gradient of optical layer repeat unit thicknesses such that the wavelengths of first order reflections from the thinnest and thickest of the optical layer repeat units differ by a factor of at least two. This provides a sheet in which the amount of light transmitted and reflected by the sheet may be controlled. That is, since transmission, T, equals 1−R−A, where R is reflection and A is absorption, a balance of transmission and reflective properties for the bodies may be achieved based on the desired use. For the great majority of the polymers useful in the practice of this invention, absorption of visible light is low.

In another embodiment of the invention, the polymeric materials in the body are elastomers. Through the use of elastomers, the body may become variably reflective in a different sense. By selective stretching of a multilayer elastomeric body, the body may be made to exhibit changes in its overall reflectivity in a colorless fashion. That is, for example, where a majority of the layers are initially in the optically thick region, stretching of the elastomeric body will thin a substantial number of the layers into the optically thin range, with a consequent increase in the overall reflectivity of the body. For example, as shown in FIG. 2, a polymeric film of the present invention when thinned exhibited a higher reflectance (92% versus 81% for visible wavelengths). If elastomers were used, the effect could be made to be reversible.

The multilayer reflective polymeric bodies of the present invention may be formed into a number of decorative and/or structural parts. The bodies may be formed by coextrusion techniques initially into sheets which may then be post formed. Such post forming operations may include thermoforming, vacuum forming, or pressure forming. Further, through the use of forming dies, the multilayer reflective body may be initially formed into a variety of useful shapes including profiles, tubes, parisons which can then be formed into blow-molded containers, lighting fixture, globes, reflectors, and the like.

In another embodiment of the invention, a birefringent light polarizer which reflects light anisotropically is provided, comprising multiple layers of at least first and second diverse polymeric materials such that at least 50% of visible light in the plane of polarization is reflected. A substantial majority of the individual layers of the polarizer have optical thicknesses in the range where the sum of the optical thicknesses in a repeating unit of the polymeric materials is greater than about 190 nm. The first and second polymeric materials differ from each other in refractive index by at least about 0.03, and the layers have a gradient of optical layer repeat unit thicknesses spanning a range of optical repeating unit thicknesses of at least about 190 nm to 340 nm times a predetermined draw ratio of at least about 1.25.

Accordingly, it is an object of the present invention to provide a formable multilayer reflective polymeric body which has a substantially uniform reflective appearance over substantially the entire range of the visible spectrum. It is a further object to provide a reflective polymeric body which may be thermoformed and drawn without affecting its substantially uniform reflective appearance. It is a further object to provide a reflective polymeric body which may be made to be variably reflective. These, and other objects and advantages of the present invention will become apparent from the following detailed description, the accompanying drawings, and the appended claims.

DETAILED DESCRIPTION OF THE PREFERRED EMBODIMENTS

Figure 1:
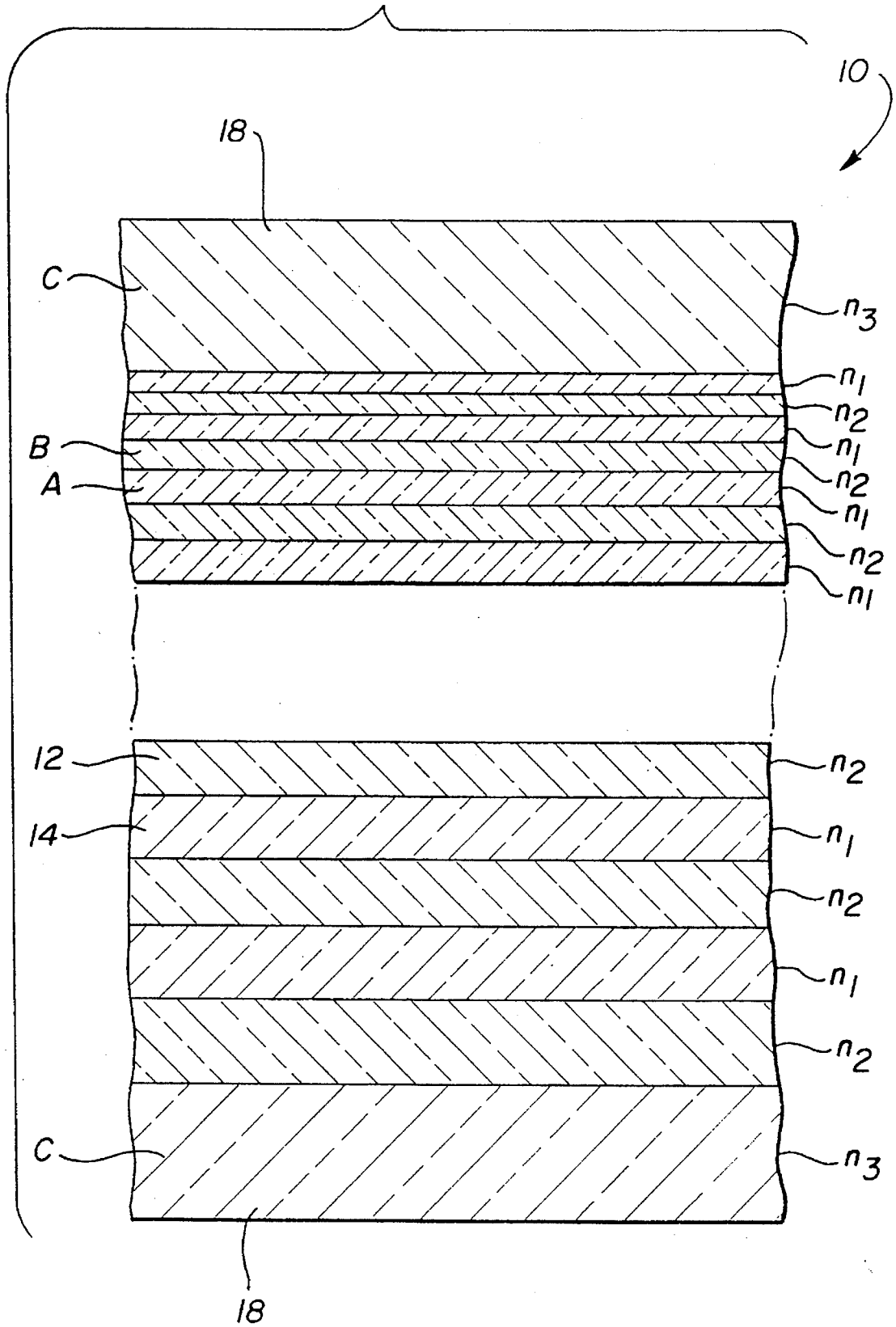
FIG. 1 is a schematic cross-section of a two component multilayer polymeric reflective body of the present invention, where the first polymer, A, has a refractive index, $n_1$, and the second polymer, B, has a refractive index, $n_2$.

The present invention provides a formable multilayer reflective polymeric body which has a substantially uniform reflective appearance over substantially the entire range of the visible spectrum. The all-polymeric body may also be thermoformed and drawn into a number of useful articles without affecting its substantially uniform reflective appearance. To obtain the substantially uniform colorless reflective appearance, the multilayer body has a gradient of optical layer repeat unit thicknesses which extends beyond that which is needed to reflect visible light, with the magnitude of the gradient of optical layer repeat unit thicknesses being sufficient to permit high draw ratios during forming. In one embodiment, the large majority of optical thicknesses in a repeating unit in the body preferably have a sum of optical-thicknesses of between about 190 nm to 1700 nm. However, the invention encompasses gradient of optical layer repeat unit thicknessess up to 3400 nm and beyond.

The optical theory of multiple reflections from optically thin layers having differing refractive indices demonstrates the dependency of the effect on both individual layer thickness and refractive index of the material. See, Radford et al, "Reflectivity of Iridescent Coextruded Multilayered Plastic Films", Polymer Engineering and Science 13, 3, pg. 216 (1973). The primary or first order reflected wavelength for a two component multilayer film for normal incidence is given by the equation below.

$$\lambda_f = 2(N_1 d_1 + N_2 d_2) \quad (1)$$

where, $\lambda_f$ is the wavelength of first order reflection in nanometers. Visible light spans the range of 380–680 nm. $N_1$ and $N_2$ are the refractive indices of the two polymers, and $d_1$ and $d_2$ are the layer thicknesses of the two polymers, also in nanometers. For a three or more component film, the above equation may be generalized to:

$$\lambda_f = 2 \sum_{i=1}^{j} N_i d_i \quad \text{(Equation 2)}$$

where $\lambda_f$, N, and d are as defined above and j is an integer greater than 1.

As can be seen for a two component system, the first order reflected wavelength is proportional to the sum of the optical thicknesses of the two polymers (where optical thickness, $N_i d_i$, is the product of layer thickness times refractive index). In addition to first order reflections, higher order reflections occur at integer fractions of the first order. The relative intensity of these higher order reflections depends on the ratio of the optical thickness of the polymer components and the number of layers.

Thus, for a selected system, changing the physical thickness of the individual layers has a direct effect on the reflected wavelength from those layers. One major area where multilayer reflective polymeric bodies may find use is in reflective articles which are produced by thermoforming. As a result of thermoforming of a polymeric sheet or film, the individual layers in a multilayer structure are thinned proportionately to the part thickness. Depending upon the particular thermoforming operation and pattern, the individual layers may be thinned more in some locations than others. For example, if a flat sheet were to be thermoformed into a container, the greatest amount of layer thinning may occur in the area where the sharpest angles or contours were formed, for example in the bottom corner of the container.

When individual layers are thinned, wavelengths of light reflected from such layers are shifted to lower wavelengths in accordance with the equations set forth above. To prevent the appearance of colors and iridescence, the multilayer polymeric bodies of the present invention are preferably designed to reflect substantially all wavelengths from the visible (380–680 nm) through the near infrared (680–3400 nm) (neglecting absorption of some wavelengths in the infrared by certain polymers). Thus, when the individual layers of the bodies of the present invention are thinned, as during a thermoforming operation, the bodies maintain their substantially uniform reflective appearance as the layers which originally reflected in the infrared range are thinned to reflect in the visible range. Layers which may have originally reflected in the visible range are thinned so that they either reflect at lower visible wavelengths or become transparent, reflecting in the ultraviolet range.

To produce a body which reflects a broad bandwidth of wavelengths in the range of from about 380–680 nm (i.e., the visible range), the body must have a gradient of optical layer repeat unit thicknesses sufficient to reflect substantially the entire range of visible light up to some predetermined maximum draw ratio (MDR). Thus, $$MDR = \frac{t_i}{t_f} \approx \frac{(\lambda_I)_{max}}{680} \quad \text{(Equation 3)}$$

Rearranging Equation 3 and substituting for $\lambda_I$ yields, $$MDR = \frac{2 \left( \sum_{i=1}^{j} N_i d_i \right)_{max}}{680} \quad \text{(Equation 4)}$$

where: MDR is the maximum draw ratio; $t_i$ is the initial thickness of the optically active layers in the multilayer stack (i.e., microlayer core), excluding protective skin layers, protective boundary layers, and other optically inactive layers such as dyed or pigmented layers; $t_f$ is the final thickness of the layers in the microlayer core in the thermoformed part at MDR; $(\lambda_1)_{max}$ is the maximum reflecting wavelength in the body (ignoring absorption) in nanometers; the summation from i=1 to j of $(N_i d_i)_{max}$ is the maximum optical repeat unit thickness in the body in nanometers; $N_i$ is the refractive index of the $i^{th}$ layer in the repeat unit; $d_i$ is the physical layer thickness of the $i^{th}$ layer in the repeat unit; and the constant 680 nm is the upper wavelength limit of visible light.

Equation 3 may be re-written to calculate the upper limit of reflected wavelength required in a multilayer body for a specified MDR as follows:

$$(\lambda_I)_{max} = (680)MDR \quad (5)$$

The corresponding minimum optical repeat unit thickness in the body is then:

$$\left( \sum_{i=1}^{j} N_i d_i \right)_{min} = \frac{380}{2} = 190 \text{ nm} \quad \text{(Equation 6)}$$

The minimum, or lower limit, of reflected wavelength in the sheet is 380 nm (lowest visible wavelength) and the maximum optical repeat unit thickness is:

$$\left(\sum_{i=1}^{j} N_i d_i\right)_{max} = (340) * MDR \qquad \text{(Equation 7)}$$

Therefore, the multilayer body for a specified maximum draw ratio requires a gradient of optical repeat unit thicknesses spanning 190 nm to (340)*MDR nm. Thus, for an MDR of five, a gradient spanning 190 to 1700 nm is required. These upper and lower limits apply irrespective of optical thickness ratio or number of layers in the optical layer repeat unit.

For a given thermoforming operation, the maximum draw ratio will depend on the geometry of the part to be formed, for example, the part height, width, or diameter, sharpness of corners, etc. Material distribution in the part can also be affected by the plug design when plug-assisted thermoforming is used, prebillowing of the sheet, location of the pattern clamp, and various other techniques which have been developed in the art of thermoforming.

With MDR and the desired reflectivity for a multilayer part specified, the multilayer sheet structure design can be completed. Polymers, and their respective refractive indices, which are useful in the practice of the present invention include all of the polymers listed in the afore-mentioned U.S. Pat. Nos. 5,122,905 and 5,122,906, the disclosures of which are hereby incorporated by reference. Reflectivity is determined by the refractive indices of the polymers and the number of optically active layers in the sheet. Multilayer sheets having only a few hundred layers can produce reflectivities of at least 40%. For greater reflectivities of 90% and above, the number of layers is generally increased to 1000 or more layers.

The gradient of optical layer repeat unit thicknesses may be introduced across the thickness of the sheet. Thus, in one embodiment of the invention, the optical layer repeat unit thicknesses will increase linearly across the thickness of the sheet. By linearly, it is meant that the optical layer repeat unit thicknesses increase at a predetermined rate across the thickness of the sheet. Other gradient of optical layer repeat unit thicknessess may be introduced by using logarithmic and/or quartic functions. We have found that for a two component multilayer body, the optimum optical thickness ratio (i.e., the ratio of the optical thickness of the polymeric components) is 2:1, yielding an "f-ratio" of ⅓, where f-ratio is defined as:

$$f_i = \frac{N_i d_i}{\sum_{i=1}^{j} (N_i d_i)}$$

and $N_i$, $d_i$, and $j$ are as previously defined. Other optical thickness ratios may be used effectively. However, we have found that the 2:1 ratio activates second order reflectance as well as first order reflectance to enhance the overall reflectivity of the body.

FIG. 1 schematically illustrates a two-component reflective film 10 having a repeating unit AB in accordance with the present invention. The film 10 includes alternating layers of first polymer 12 having a refractive index, $n_1$, and a second polymer 14 having a refractive index, $n_2$. FIG. 1 shows a preferred form of the invention where substantially all of the layers of the film have optical thicknesses where the sum of the optical thicknesses of the repeat unit is greater than about 190 nm. FIG. 1 also depicts a linear gradient of optical layer repeat unit thicknesses for the film.

Skin layers of a polymer (C) 18 which can have a refractive index $n_3$ are shown positioned on both major exterior surfaces of the reflective body to protect the other layers from scratches or weathering or to provide support for the other layers. The polymer C may be the same or different for each exterior surface and may, in some cases, be the same as the A or B polymer components. Likewise, $n_3$ may be different from or the same as the refractive index for either of the A or B polymers.

The skin layers may make up as much as 20% of the total thickness of the film and are optically inactive. The skin layer polymers are chosen for their transparency, compatibility with the A and B polymer components of the multilayer body, and durability, scratch resistance, and/or weatherability.

Preferably, the polymers chosen have a refractive index mismatch of at least 0.03 at the visible wavelengths 380–680 nm. Typically, refractive indices of materials, including polymers, are measured at a convenient wavelength in the visible range such as 589 nm sodium vapor. Examples of suitable thermoplastic polymeric resins which may be used in the practice of the present invention are contained in Wheatley et al, U.S. Pat. No. 5,126,880, the disclosure of which is hereby incorporated by reference.

It is preferred that the polymers selected have compatible rheologies for coextrusion. That is, as a preferred method of forming the multilayer films is the use of coextrusion techniques, the melt viscosities of the polymers must be reasonably matched to prevent layer instability or nonuniformity. The polymers used also should have sufficient interfacial adhesion so that the films will not delaminate. Alternatively, a third polymer may be used as an adhesive or glue layer to secure the first and second polymer layers together.

Multilayer bodies in accordance with the present invention are most advantageously prepared by employing a multilayered coextrusion device as described in U.S. Pat. Nos. 3,773,882 and 3,884,606 the disclosures of which are incorporated herein by reference. Protective boundary layers may be added to the multilayer bodies by an apparatus as described in commonly-assigned U.S. application Ser. No. 07/955,788, filed Oct. 2, 1992, now U.S. Pat. No. 5,269,995 to Ramanathan et al entitled, "Improved Control of Protective Boundary Layer", the subject matter of which is hereby incorporated by reference. Such coextrusion devices provide a method for preparing multilayered, simultaneously extruded thermoplastic materials, each of which are of a substantially uniform layer thickness. To increase the total number of layers in the multilayer body, preferably a series of layer multiplying means as are described in U.S. Pat. Nos. 5,094,793 and 5,094,788, the disclosures of which are incorporated herein by reference may be employed. The layer multiplying means are termed interfacial surface generators, or ISG's.

Gradients of optical layer repeat unit thicknesses may be introduced into the multilayer body by controlling the volume of heat plastified polymers passing through the feed ports of the co-extrusion device as taught in Schrenk, U.S. Pat. No. 3,687,589. Alternatively, the optical layer repeat units may be introduced upstream of the interfacial surface generators by the use of adjustable valves to control the amount of heat plastified polymer introduced at the various feed slots to the ISG's. In yet another alternative method for introducing a gradient of optical layer repeat unit thicknesses into the multilayer polymeric body, a temperature gradient may be imposed on the feedblock to the co-extrusion device.

In operation, the feedblock of the coextrusion device receives streams of the diverse thermoplastic polymeric materials from a source such as a heat plastifying extruder.

The streams of resinous materials are passed to a mechanical manipulating section within the feedblock. This section serves to rearrange the original streams into a multilayered stream having the number of layers desired in the final film. Optionally, this multilayered stream may be subsequently passed through a series of layer multiplying means (i.e., ISG's) in order to further increase the number of layers in the final film.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered film in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the film after extrusion are all factors which affect the thickness of the individual layers in the final film.

The feedblock of the coextrusion device is preferably designed to deliver an approximately linear optical layer repeat unit to the ISG's to achieve the substantially uniform broadband reflectance for the body. For up to eight layer multiplications, a gradient of thickest to thinnest layers from the feedblock should have a ratio of thickest to thinnest of at least about 1.4, with a ratio of 4:1 being preferred. If a greater number of layer multiplications are used, the gradient ratio at the feedblock may be reduced. The feed blocks may be designed, as taught in the above-mentioned patents, to deliver overlapping layer thickness distributions which fit a linear, quartic, or other regular function. The overlapping thickness in the segments having linear gradients produces a redundancy in layers having substantially the same thickness. This redundancy is desirable as it compensates for any flaws or inconsistencies in the layers by placing groups of layers at different locations within the reflective body which reflect in the same wavelength region.

Figure 14:
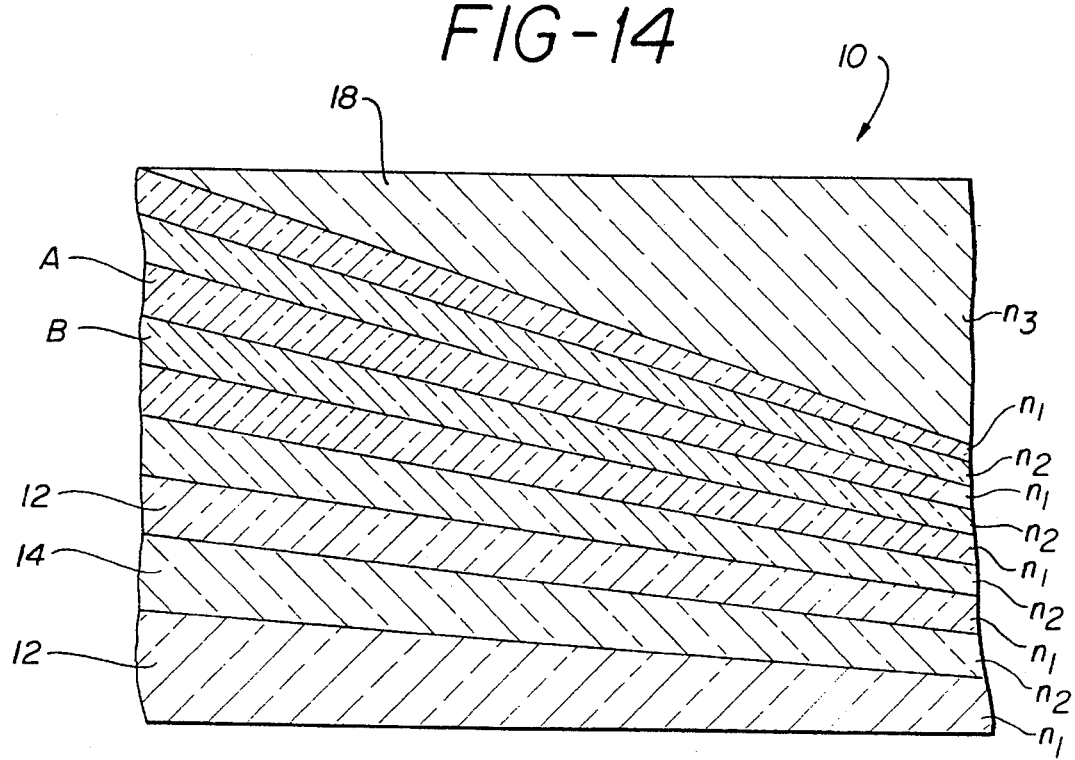
FIG. 14 is a schematic cross section of a two component multilayer reflective body in which the individual layers vary in thickness across the body.

The feedblock of the coextrusion device may also be designed to deliver layers which taper in thickness from one side of the polymeric body to the other. FIG. 14 illustrates schematically this embodiment of the invention in which alternating layers of first and second polymers 12 and 14, respectively, taper linearly across the surface of film 10. Skin layer 18 is supplied using a shaped skin feed slot to provide film 10 with a uniform overall thickness.

The embodiment shown in FIG. 14 provides a variably reflective sheet which possesses a varying reflectance across the surface of the sheet. That is, the measured reflectance of the sheet changes from one side to the other. The sheet includes at least first and second diverse polymeric materials which comprise a sufficient number of alternating layers such that at least a portion of visible light incident on the sheet is reflected. A substantial majority of the individual layers of the sheet have optical thicknesses in the range where the sum of the optical thicknesses in a repeating unit of said polymeric materials is greater than about 190 nm, and the first and second polymeric materials differ from each other in refractive index by at least about 0.03.

In order that the invention may be more readily understood, reference is made to the following examples, which are intended to be illustrative of the invention, but are not intended to be limiting in scope.

EXAMPLE 1

Employing an apparatus as generally described in U.S. Pat. Nos. 3,773,882 and 3,759,647, a 2625 alternating layer reflective film was produced. The film was approximately 0.021 inches (0.53 mm) in thickness and had 2625 alternating layers (AB) of polycarbonate (Calibre 300-22, trademark of Dow Chemical Company) and polymethyl methacrylate (Cyro Acrylite H15-003, trademark of Cyro Industries). The sum of the optical thicknesses in the AB repeating unit was at least 190 nm. The refractive index of the polycarbonate (PC) was 1.586, while the refractive index of the polymethyl methacrylate (PMMA) was 1.49.

Figure 2:
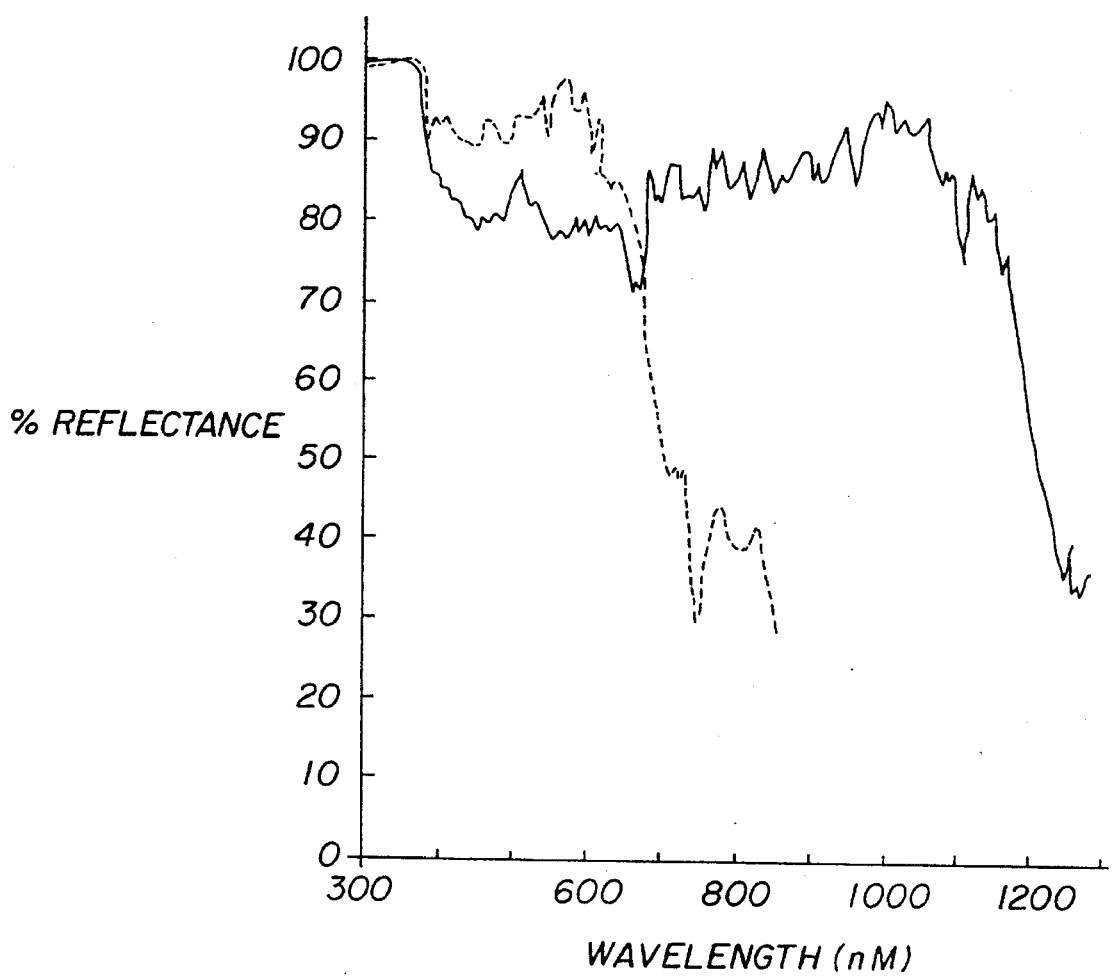
FIG. 2 is a graph of reflectance versus wavelength for a 2625 layer two-component film of the present invention.

A gradient of optical layer repeat unit thicknesses (thickest to thinnest optical layer repeat unit) of 2.76:1 was introduced into the multilayer film by controlling the temperature in the feedblock to achieve a differential of 50° F. As shown by the solid line in FIG. 2, the film has 81% reflectance at visible wavelengths (380–680 nm).

A second film sample was prepared identical to the first sample and then was drawn down to a thickness of 0.012 inches (0.30 mm). This produced a thickness reduction of 1.75:1 and simulated thermoforming conditions. As can been seen from the dashed line in FIG. 2, the overall reflectance in the visible range increased to 92%.

EXAMPLE 2

To demonstrate the visible reflecting capabilities of the film of the present invention, a computer simulation was run to predict the reflectance characteristics of two-component polymethyl methacrylate/polycarbonate multilayer films having 2496, 3744, and 4992 layers, respectively. The simulation used a software program entitled "Macleod Thin Film Optics" available from Kidger Optics, Sussex, England. The sum of the optical thicknesses of the layers in the AB repeat unit of the film were assumed to be in the range of from 190 to at least 1700 nm. A refractive index mismatch of 0.1 was assumed based on the actual mismatch of the two polymers when measured at visible wavelengths.

The 2496 layer film was assumed to have been produced using a four channel variable vane ISG layer multiplier design as taught in the afore-mentioned U.S. Pat. No. 5,094,793 to divide an incoming 624 layer segment into four segments and stacking the segments on top of each other in thickness ratios of 0.301/0.279/0.232/0.188. The ratio of stack thicknesses may be controlled by controlling vane position; it was assumed in this example that a 4:1 optical layer repeat unit was delivered from the feedblock. The 3744 and 4992 layer films were assumed to be produced using a two channel variable vane ISG followed by either a three or four channel variable vane ISG.

The 2496 layer film had a thickness of 0.89 mm, including 20% of that thickness for skin and protective boundary layers. The 3744 layer film had a thickness of 1.58 mm, and the 4992 layer film had a thickness of 1.40 mm, respectively, with the same 20% of thickness taken up by skin and protective boundary layers. The 3744 layer film was assumed to have a 3.5:1 feedblock gradient and was divided using a two segment ISG into layer segments having thickness ratios of 0.576/0.424. The layer segments were stacked and then further divided by a three segment ISG into layer segments having a 0.368/0.332/0.300 thickness ratio. The 4992 layer film had a 3.5:1 feedblock gradient, and the layer segment were stacked with a 0.54/0.46 split from a two segment ISG followed by a 0.300/0.285/0.220/0.195 split from a variable four segment ISG.

Figure 3A:
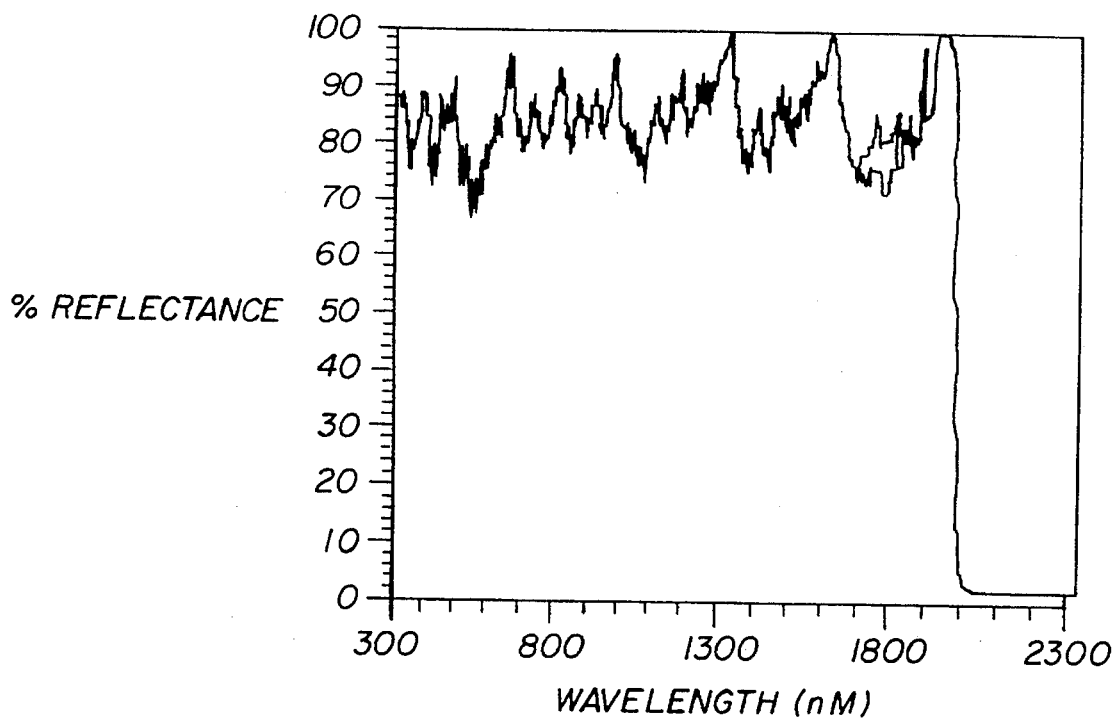
FIGS. 3a, 3b, and 3c are calculated graphs of reflectance versus wavelength for 2496, 3774, and 4992 layer two-component film of the present invention, respectively.
Figure 3B:
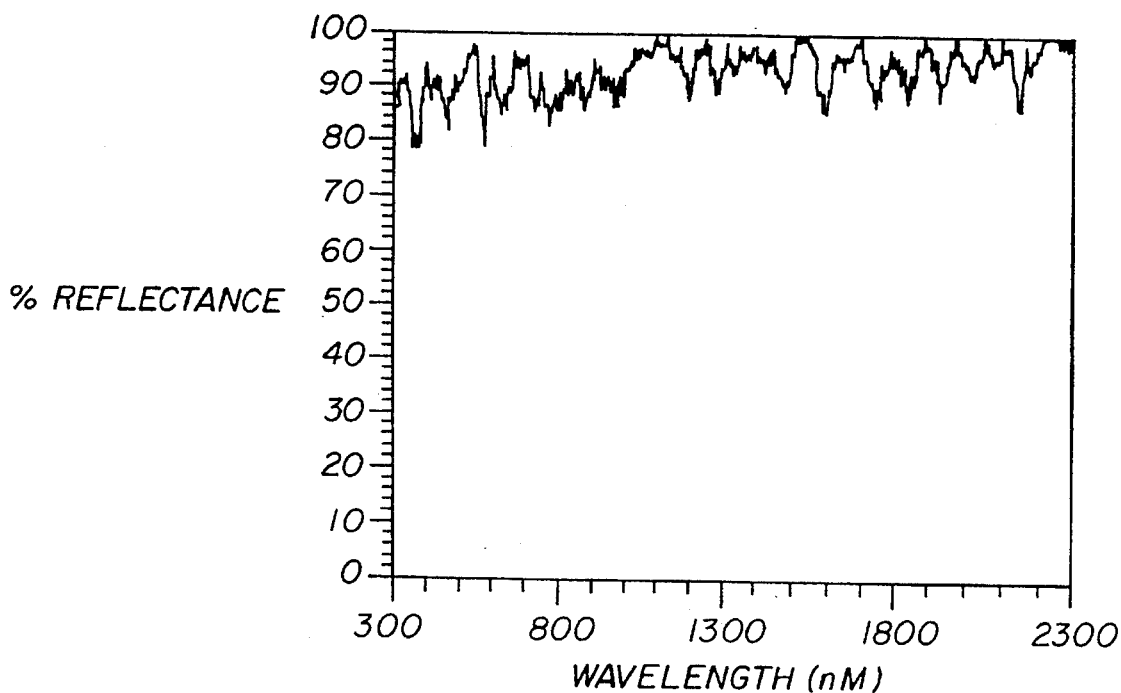
Figure 3C:
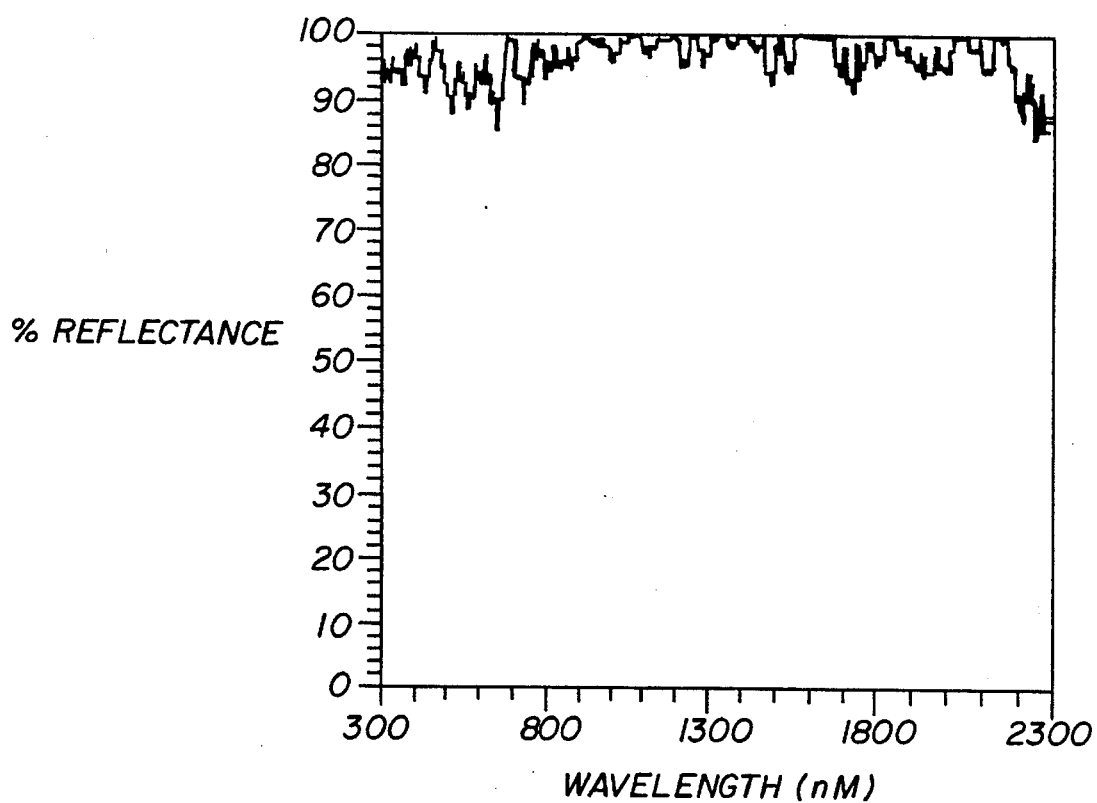
Figure 4:
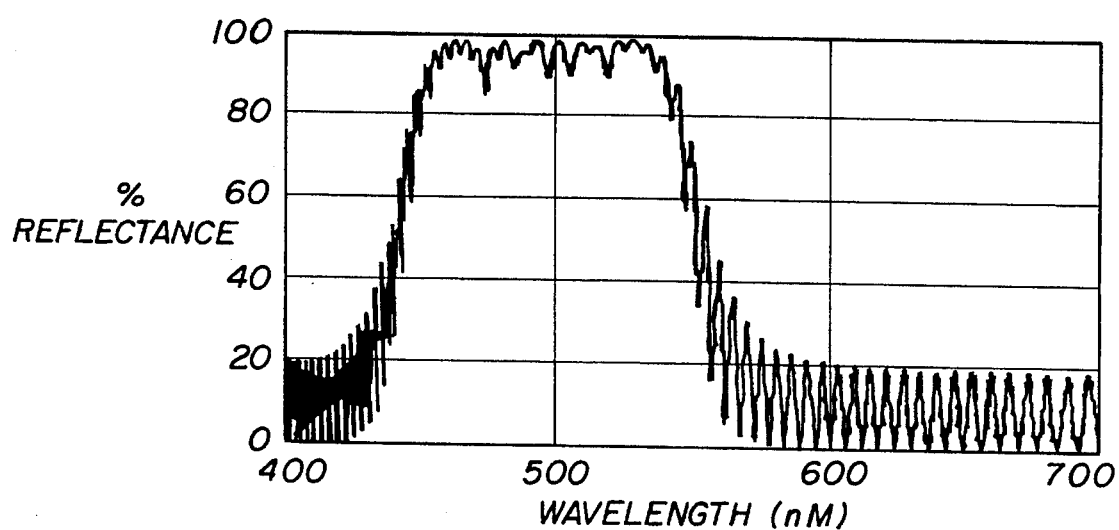
FIGS. 4–8 are graphs of reflectance versus wavelength for five samples taken from Alfrey et al, U.S. Pat. No. 3,711,176.
Figure 5:
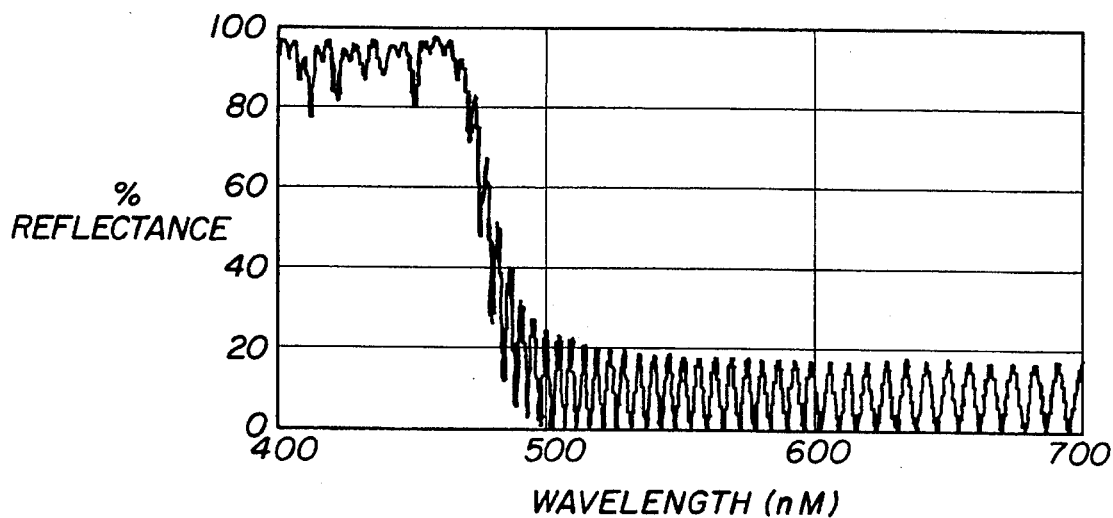
Figure 6:
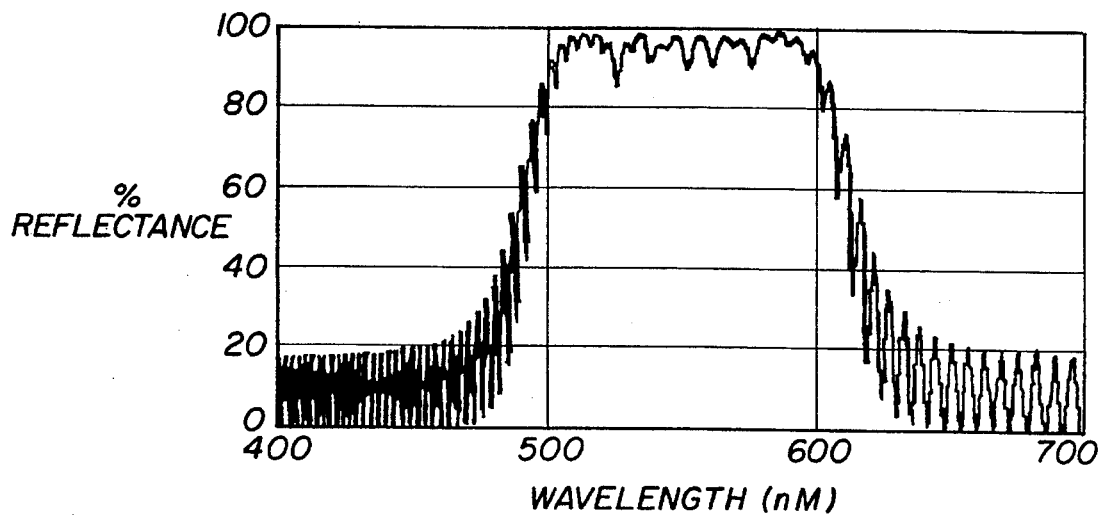
Figure 7:
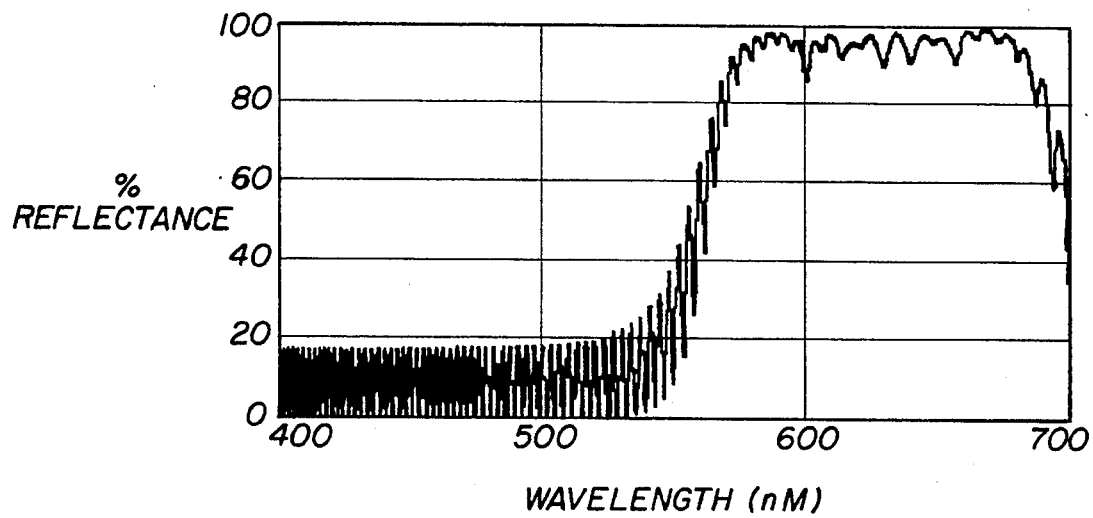
Figure 8:
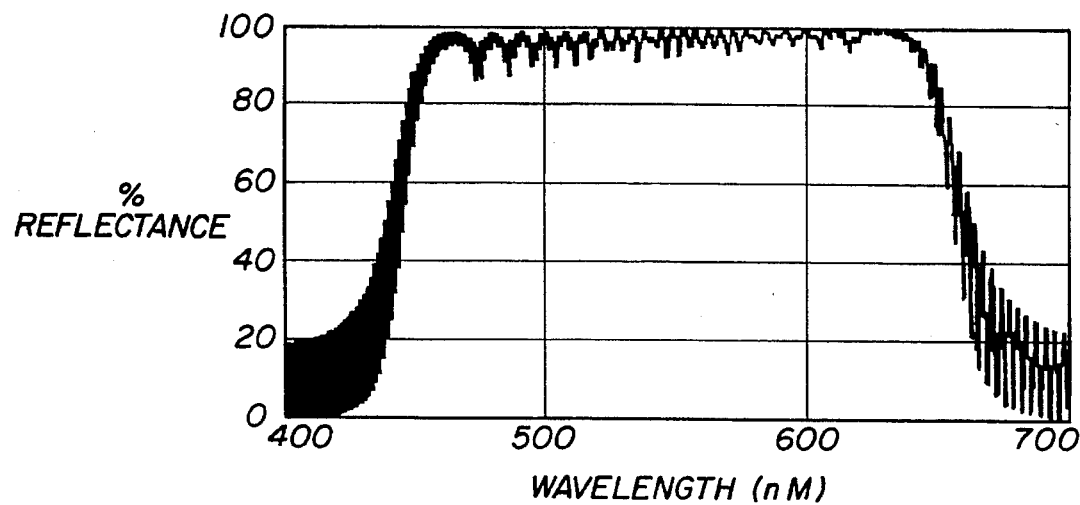

As can be seen from FIGS. 3(a)–3(c), the 2496 layer design produced an average reflectance in the visible range of greater than 80%, the 3744 layer design produced an average reflectance in the visible range of greater than 85% with no wavelength below 80%, and the 4992 layer design produced an average reflectance in the visible range of 95% with no wavelength below 85%.

For purposes of thinning the film for thermoforming, the minimum part thickness can be calculated using the following equation:

$$t_{min} = \frac{t_{init} * 680}{(\lambda_1)_{max}}$$

Thus, for the 4992 layer film having an initial thickness of 1.4 mm and which reflects to 2300 nm, a part may be thermoformed to a 1.4*680/2300=0.41 mm wall thickness before uniformity of reflectance over the visible range is lost and the onset of iridescent color is observed.

By way of comparison, an optically thick two component film having 2625 layers and a refractive index mismatch between polymers of 0.1 made in accordance with the teachings of Wheatley et al, U.S. Pat. No. 5,122,905, would be initially 3.2 mm thick. It could be formed into a part 1.5 mm thick before the onset of iridescent color while having a reflectivity of 75%. Thus, it can be seen that the multilayer film of the present invention can be formed into much thinner parts having a higher overall reflectivity.

EXAMPLE 3

Computer simulations were prepared from the Macleod software to compare the spectra of samples reported in Alfrey et al, U.S. Pat. No. 3,711,176, before and after drawing to thin the layers to demonstrate that Alfrey et al do not teach a formable multilayer film which possesses substantially uniform reflectance over the visible range of the spectrum. FIGS. 4–8 are calculated spectra for the examples reported by Alfrey et al at column 5, lines 20–65 of the patent.

Figure 9:
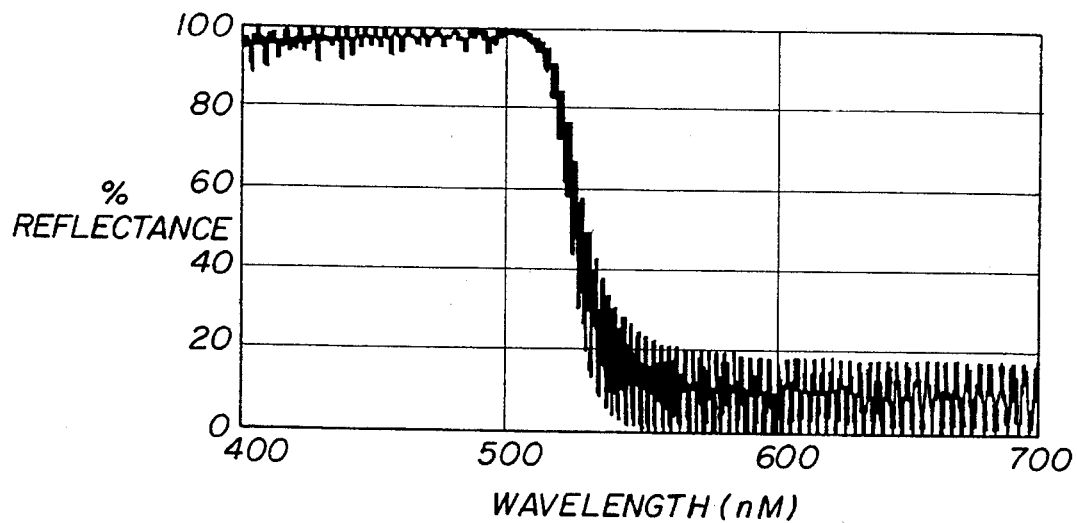
FIG. 9 is a calculated graph of reflectance versus wavelength for the film of FIG. 8, thinned by 20%.

The examples illustrated in FIGS. 1–4 of Alfrey et al shown nonuniform reflectance over the visible range. Likewise, the spectra for FIGS. 4–8, showing the Alfrey examples, demonstrate that the examples produce nonuniform colored reflectances only over a portion of the visible range. The example shown in FIG. 8, a 500 layer sample with a linear optical layer repeat unit, shows the greatest bandwidth having a high degree of reflectance (from about 450 to 650 nm) but still has a green metallic appearance and clearly does not span substantially the entire visible spectrum of 380 to 680 nm. Moreover, thinning such a film only 20% (i.e., a 1.25:1 draw ratio or thinning factor) greatly shifts the spectrum and changes the color (to blue) of the film as shown by FIG. 9.

EXAMPLE 4

Figure 10:
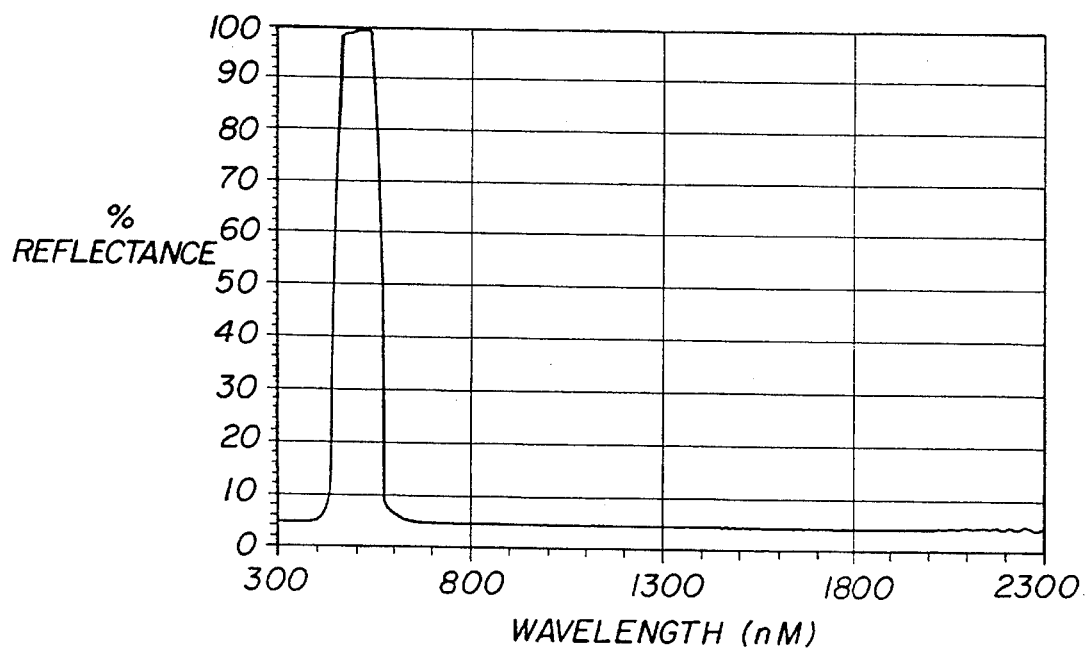
FIG. 10 is a calculated graph of reflectance versus wavelength for the fifth sample of Alfrey et al, with the axis of wavelength extended to 2300 nm.
Figure 11:
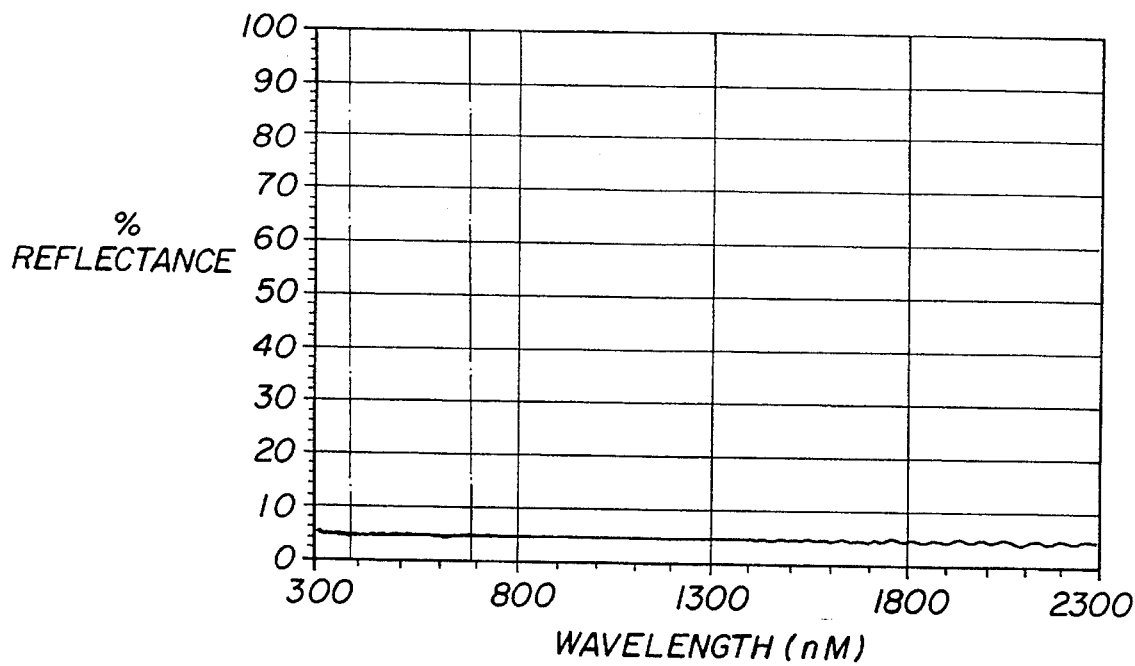
FIG. 11 is a calculated graph of reflectance versus wavelength for the film of FIG. 10, thinned by one-half.

To demonstrate the unique capabilities and features of the present invention to maintain a substantially uniform reflective appearance over substantially the entire range of the visible spectrum, a film in accordance with the present invention was simulated using the Macleod software program described in Example 2 and then compared against the fifth sample of Alfrey et al (see column 5, lines 61–64). FIG. 10 shows the percentage reflectance of the fifth sample of Alfrey plotted against wavelength to 2300 nm. As can be seen, the film is reflective only over a portion of the visible spectrum and is substantially transparent to infrared wavelengths. FIG. 11 illustrates a computer simulation, also using the Macleod software, of the effect of thinning the Alfrey et al film to one-half its original thickness (i.e., a 2:1 draw). Reflectivity of the film drops to approximately 5% for all wavelengths, and the film becomes transparent.

Figure 12:
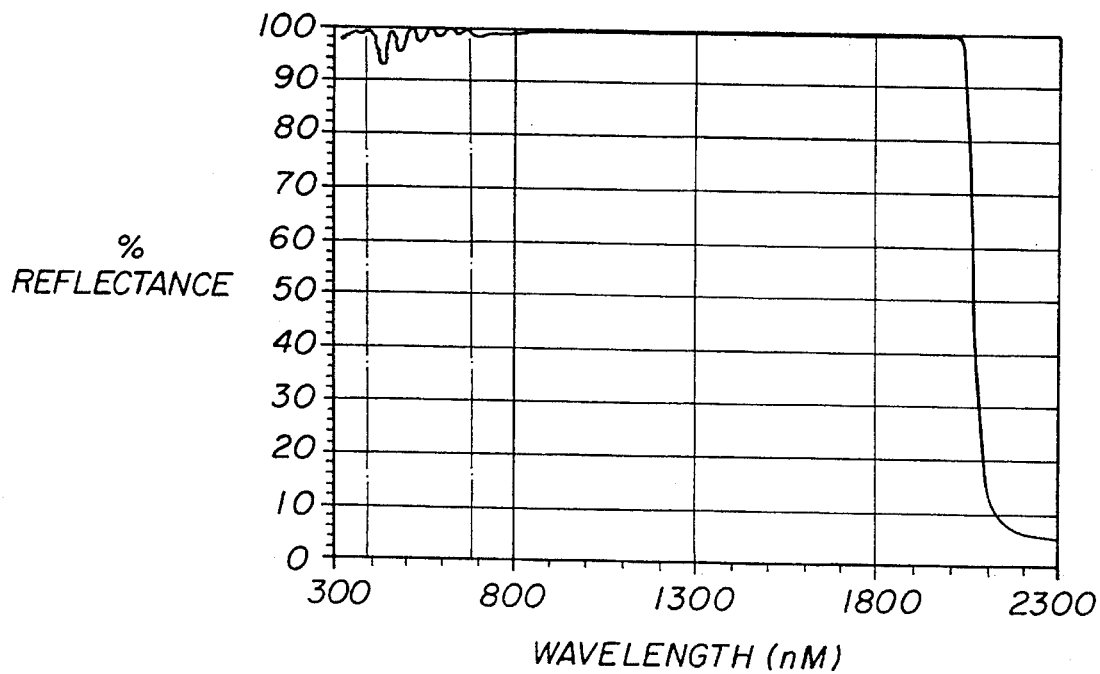
FIG. 12 is a calculated spectrum for a 5000 layer film of the present invention which has a gradient of optical repeat unit thicknesses designed to span wavelengths from 380 to 2000 nm.
Figure 13:
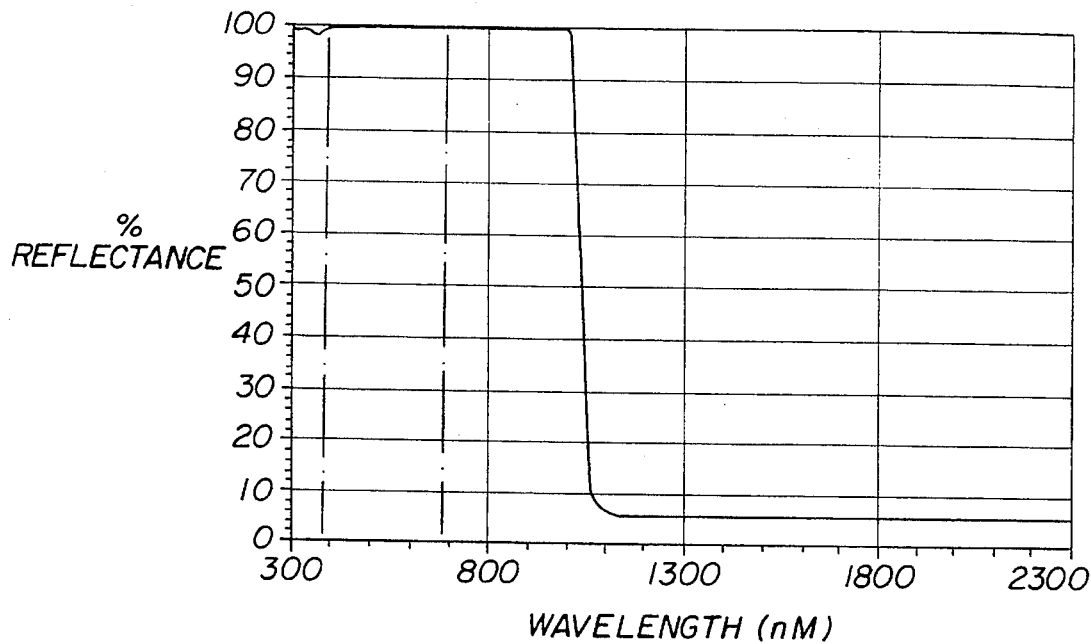
FIG. 13 is a calculated spectrum for the film of FIG. 12, thinned by one-half.

FIG. 12 illustrates the calculated spectrum for a 5000 layer film of the present invention (alternating layers AB of polycarbonate and polymethyl methacrylate having a refractive index mismatch of 0.1) which has a linear thickness gradient designed to span wavelengths from 380 to 2000 nm and which is 1.5 mm thick. Reflectance of the film in both the visible and infrared portion of the spectrum is uniform and high, varying between about 93 and 100%. FIG. 13 illustrates the calculated spectrum for the film of FIG. 12 after thinning to one-half its original thickness (2:1 draw to 0.75 mm thickness). Reflectivity remains both high and uniform over the entire visible spectrum. The film could be further thinned to a thickness of only about 0.58 mm before the onset of iridescent color.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A formable polymeric multilayer reflective body having a substantially uniform reflective appearance over substantially the entire range of the visible spectrum comprising:

at least first and second diverse polymeric materials, the body comprising a sufficient number of alternating layers of said first and second polymeric materials such that at least 40% of visible light incident on said body is reflected, a substantial majority of the individual layers of said body having optical thicknesses in the range where the sum of the optical thicknesses in a repeating unit of said polymeric materials is between about 190 nm and 1700 nm, wherein said first and second polymeric materials differ from each other in refractive index by at least about 0.03, wherein said layers have a gradient of optical layer repeat unit thicknesses through the thickness of said body which is sufficient to reflect substantially the entire range of visible light up to a predetermined maximum draw ratio $$MDR = \frac{2\left(\sum_{i=1}^{j} N_i d_i\right)_{max}}{680}$$

where MDR is the maximum draw ratio; $t_i$ is the initial thickness of the optically active layers in the multilayer stack; $t_f$ is the final thickness of the layers in the microlayer core in the thermoformed part at MDR; $(\lambda_1)_{max}$ is the maximum reflecting wavelength in the body in nanometers; the summation from i=1 to j of $(N_i d_i)_{max}$ is the maximum optical repeat unit thickness in the body in nanometers; $N_i$ is the refractive index of the $i^{th}$ layer in the repeat unit; $d_i$ is the physical layer thickness of the $i^{th}$ layer in the repeat unit; and the constant 680 nm is the upper wavelength limit of visible light.

2. The formable polymeric multilayer reflective body of claim 1 in which said polymeric materials are elastomers.

3. The formable polymeric multilayer reflective body of claim 1 in which said gradient of optical layer repeat unit thicknesses is a function which provides substantially continuous wavelength coverage spanning the range of from about 380 nm to about 2000 nm.

4. The formable polymeric multilayer reflective body of claim 1 in which said gradient of optical layer repeat unit thicknesses is a linear function.

5. The formable polymeric multilayer reflective body of claim 1 wherein the reflectance of said body changes upon the thinning of said layers.

6. The formable polymeric multilayer reflective body of claim 1 wherein said body has at least 1000 layers.

7. The formable polymeric multilayer reflective body of claim 1 wherein at least 80% of visible light incident on said body is reflected.

8. A formable polymeric multilayer reflective body having a substantially uniform reflective appearance over substantially the entire range of the visible spectrum comprising:

at least first and second diverse polymeric materials, the body comprising a sufficient number of alternating layers of said first and second polymeric materials such that at least 40% of visible light incident on said body is reflected, a substantial majority of the individual layers of said body having optical thicknesses in the range where the sum of the optical thicknesses in a repeating unit of said polymeric materials is between about 190 nm and 1700 nm, wherein said first and second polymeric materials differ from each other in refractive index by at least about 0.03, wherein said layers have a gradient of optical layer repeat unit thicknesses through the thickness of said body such that said gradient of optical layer repeat unit thicknesses provide continuous wavelength coverage over substantially the entire range of the visible spectrum for said body to maintain a substantially uniform reflective appearance when drawn, and wherein said gradient of optical layer repeat unit thicknesses is a quartic function.

9. The formable polymeric multilayer reflective body of claim 8 in which said quartic function which defines said gradient of optical layer repeat unit thicknesses is superimposed on a linear gradient.

* * * * *